(12) United States Patent
Theis et al.

(10) Patent No.: US 6,572,276 B1
(45) Date of Patent: Jun. 3, 2003

(54) PLUG FOR FIBER OPTIC CABLES WITH A PLUG HOUSING

(75) Inventors: Hans Theis, Mittenaar (DE); Michael Theis, Mittenaar (DE); Günter Herr, Ehringshausen-Dreisbach (DE)

(73) Assignee: Euromicron Werkezeuge GmbH, Mittenaar (DE)

( * ) Notice: Subject to any disclaimer, the term of this patent is extended or adjusted under 35 U.S.C. 154(b) by 0 days.

(21) Appl. No.: 09/718,446

(22) Filed: May 15, 2001

(51) Int. Cl.⁷ ................................................ G02B 6/36
(52) U.S. Cl. ...................................................... 385/78
(58) Field of Search ........................... 385/76, 77, 78, 385/72

(56) References Cited

U.S. PATENT DOCUMENTS

| | | | |
|---|---|---|---|
| 5,212,752 A | * 5/1993 | Stephenson et al. | 385/78 |
| 5,315,679 A | 5/1994 | Baldwin et al. | 385/76 |
| 5,394,497 A | * 2/1995 | Erdman et al. | 385/60 |
| 5,542,015 A | * 7/1996 | Hultermans | 385/139 |
| 5,579,425 A | * 11/1996 | Lampert et al. | 385/55 |
| 5,862,282 A | * 1/1999 | Matsuura et al. | 385/60 |
| 5,926,596 A | * 7/1999 | Edwards et al. | 385/78 |
| 5,971,625 A | * 10/1999 | Lu | 385/55 |
| 6,126,325 A | * 10/2000 | Yamane et al. | 385/70 |
| 6,151,432 A | * 11/2000 | Nakajima et al. | 385/60 |
| 6,302,591 B1 | * 10/2001 | Nagaoka et al. | 385/59 |
| 2001/0014197 A1 | * 8/2001 | De Marchi | 385/77 |
| 2002/0076165 A1 | * 6/2002 | Childers et al. | 385/78 |
| 2002/0081077 A1 | * 6/2002 | Nault | 385/78 |

* cited by examiner

*Primary Examiner*—Lynn D. Feild
*Assistant Examiner*—Hae Moon Hyeon
(74) *Attorney, Agent, or Firm*—Sonnenschein, Nath & Rosenthal

(57) ABSTRACT

A plug for light wave conductors or photo-conductors with a plug housing into a rear end of which a photo-conductor bundle with at least two photo-conductor fibers is introduced, and from an oppositely lying front end of which there emerge ferrules, into which, in each case, one of the photo-conductor fibers is introduced. The ferrules are supported in a ferrule housing which is installed in a plug housing correspondingly formed for the reception of the ferrule housing. The ferrules are movable, spring-loaded in their axial direction, in which the plug is intended for being plugged together with a coupling housing that receives this plug. The ferrule housing comprises a core housing and a core interior housing, which are designed for the reception of two ferrules. The ferrules are supported in the core housing. Front ends of the ferrules extend forward through the core housing and rear ends of the ferrules extend into the core interior housing. The core housing and core interior housing are plugged relatively at least partly into one another and form a double unit.

14 Claims, 10 Drawing Sheets

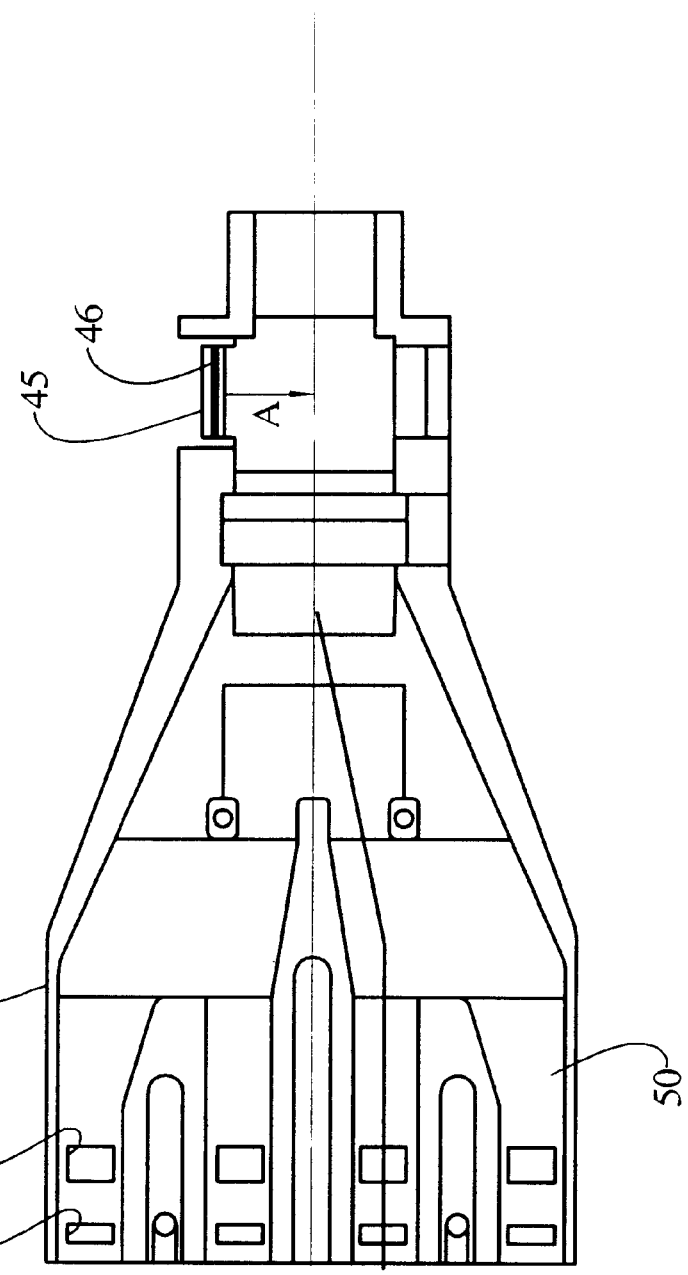

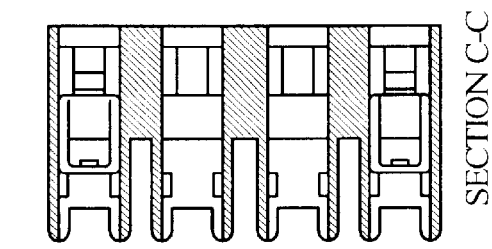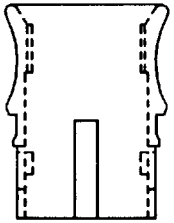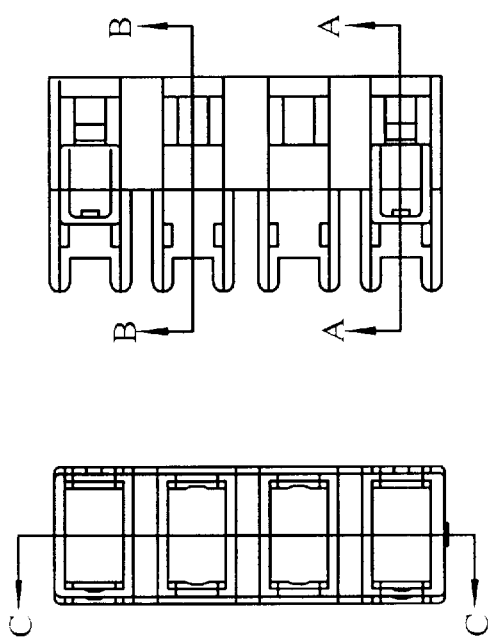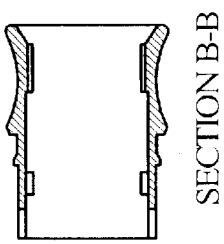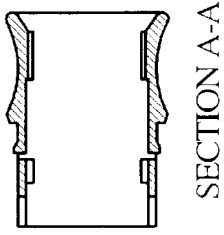

A - A

PLUG FOR FIBER OPTIC CABLES WITH A PLUG HOUSING

BACKGROUND OF THE INVENTION

The invention relates to a plug for fiber optic cables or lightwave guides with a plug housing, on the rear end of which a photo-conductor bundle with at least two fiber-optic fibers is introduced, and from the oppositely lying front end of which ferrules emerge, into which, in each case, one of the lightwave conductor fibers is introduced, the ferrules being supported in a ferrule housing which is installed in a plug housing correspondingly formed for the reception of the ferrule housing, and the ferrules, spring loaded, being movable in their axial direction, the plug being intended for its being plugged together with a coupling housing that receives it.

Plugs according to the category of the state of the art are constructed -in principle according to U.S. Pat. No. 5,315,679. Through this document there has become known a plug for photo-conductor cables which consist of a plug housing with two two-dimensional half shells, in the interior of which there are arranged two ferrules. The ferrules are individually supported each in a closed ferrule housing, in which a so-called zip-cord cable, which contains two fiber-optic fibers, is conducted in two individual cables. Each cable is led singly within the plug housing to the particular ferrule housing for the individual ferrule, for which reason each cable must be taken up singly and separately and relieved of tension. This type of ferrule guidance is known under the designation simplex guidance or simplex ferrule and is distinguished in that a separate ferrule housing is present for each ferrule. Also double plugs or plugs with more than two ferrules, 2n-ferrules, are made up of individual simplex ferrules.

Further, it is a known practice to construct a double plug from two ferrules, the ends of which with the photo-conducting fibers end up in a common face surface or plate of plastic and are cast therein. Although this arrangement permits a higher packing density of the individual plugs or ferrules, such a plug has the disadvantage that the individual ferrules, for reasons of manufacture, no longer have any convex contact shape. For the surface of a simplex ferrule preferably has a convex contact shape under an angle of between 8 and 9 degrees (so-called angle-polishing connector=apc contacting). In this case the ferrule shaped convexly at the tip strikes upon the tip of the likewise convex-shaped ferrule of the oppositely lying plug in the coupling, this ferrule being turned over 180 degrees with respect to the first-mentioned ferrule. In this manner it is insured that reflected stray light is to the greatest possible extent harmless and can come only to a fractional part into the photo-conducting fibers. This apc contacting, however, is possible only with individual ferrules.

Further, plugs must be secured against inadvertent pulling-out of the plug by improper handling. It has proved that the releasing mechanism can also be obtained by a strong pulling that takes place on the photo-conducting cable itself, which should not release the connection between plug and coupling.

Underlying the invention is the problem of creating a plug of the category-forming type, which makes possible the construction of a double-plug or of a multiple double-plug, in which the advantages of the individual ferrule remain preserved, in particular in which the possibility of the apc contact of two oppositely lying ferrules is given; further, the plug should make possible a high packing density. Further, the plug is to have a dependable security against pull-out, so that it cannot be pulled out inadvertently by pulling on the cable.

SUMMARY OF THE INVENTION

This problem is solved according to the invention in a plug of the technical field mentioned at the outset by the means that the ferrule housing consists of a core housing and a core-interior housing, which are constructed for the reception of two ferrules, in which the ferrules are supported in the core housing, the front ends of the ferrules extend forward through the core housing, and the rear ends of the ferrules extend into the core-interior housing, core housing and core-interior housing being plugged at least partly into one another and forming a double unit.

In a further mode of execution of the plug, the core-interior housing is plugged at least partly into the core housing, in which case a receiving housing is emplaced on the rear part of the core-interior housing, into which receiving housing the photo-conductor bundle is introduced, while the core housing, the core-interior housing and the receiving housing are plugged into the plug housing and are supported floatingly in the plug housing. In a further form of execution of the plug the core housing, by the plugging in to the plug, locks into a coupling with its front end by reason of a mutual interlocking in the coupling.

With the invention there is made possible in an advantageous manner the construction of a double plug or of a multiple double plug, in which the decisive advantages of the individual ferrule remain preserved and, in particular there is given the possibility of the apc contacting of two ferrules lying opposite one another in a coupling. A further advantage of the invention lies in that the plug makes possible a high packing density, which is possible by reason of the double units according to the invention. Likewise the plug has a dependable pull-out safeguard, so that it cannot be pulled out inadvertently by a pull on the photo-conducting cable.

In a further advantageous form of execution of the plug, the core housing has the shape of a housing block with side walls and a front face surface, in which two passage holes are centrally present for the passage of the ferrules, the housing block being open to the rear for the reception of the ferrules.

In a further advantageous form of execution of the plug the core interior housing comprises a block plate provided with passage holes, on the front side of which block there is emplaced a double cylinder with two passage holes extending in axial direction of the plug and on the rear side of which two guide tongues extend in axial direction for introduction into the rear receiving housing, the guide tongues and the receiving housing having reciprocal locking means.

In a further advantageous form of execution of the plug the locking means consist of rest lugs arranged on the guide tongues, which tongues—after introduction into the receiving housing lock in rest windows arranged therein, the receiving housing having the form of the housing—lock with side walls which have the rest windows in the corresponding places.

The mutual locking of the core housing and coupling can, with respect to the core housing, consist of a transverse groove which runs in the narrow side of the core housing, the coupling consisting of an outer coupling housing and of an inner coupling housing which is formed from a substantially block-form plate on which two arms rise vertically, on the ends of which rest lugs are arranged which, in the sliding-in of the core housing, lock in the transverse grooves between the two arms of the inner coupling housing.

In particular, the double units of the invention make possible, for the support of always two ferrules simultaneously, the construction of multiple double-plugs, namely 2n double-plugs which are constructed more compact and smaller than comparable plugs of the stage of the art. For the construction of a multiple double plug, the double unit comprising front core housing and rear core inner housing is present multiply in an identical manner, the double units being arranged adjacent to one another in a receiving housing.

In this case, the receiving housing consists of two housing shells arranged one over the other, between which the double units are arranged next to one another, in which the core inner housings is locked in the housing shells by means of interlocking, and double units as well as receiving housing are plugged into a multiple plug housing and supported floatingly there, which multiple-plug housing comprises a plurality of double housings arrayed on one another and connected with one another. In a further form of execution of the multiple double plug the two outer double plug housings of the multiple plug housing have lash plates for the releasing of the locking by pressing-in of the lash plates with the receiving housing.

BRIEF DESCRIPTION OF THE DRAWINGS

Examples of the invention are represented in the drawing, in which:

FIG. 11 shows a plan view of a housing shell of the rear receiving housing, FIG. 12 shows a view of the face side of FIG. 11, FIG. 13 shows a plan view of a multiple plug housing, FIG. 14 shows a lateral plan view of FIG. 13, FIG. 15 shows a section along the line C—C in FIG. 13, FIG. 16 shows a section along the line A—A in FIG. 14, FIG. 17 shows a section along the line B—B in FIG. 14, FIG. 18 shows a side view of the multiple plug housing of FIG. 19, FIG. 19 shows a perspective view of FIG. 13, FIG. 22 shows a section along the line A—A of the part 2 in FIG. 2.

DETAILED DESCRIPTION OF THE PREFERRED EMBODIMENTS

Figure 1:
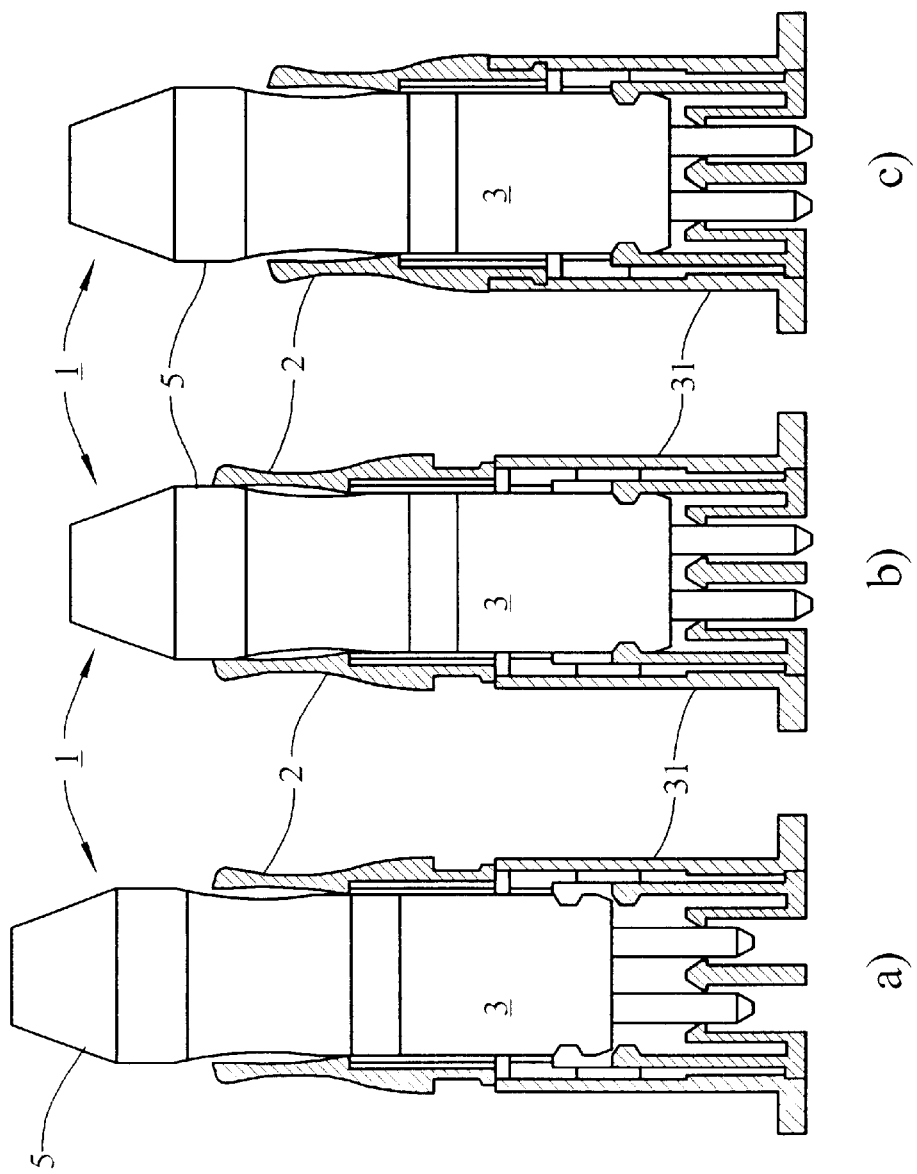
FIGS. 1a), b), c) show schematic section views of the plug according to the invention for the representation of the different relative positions of the individual parts in the sliding of the plug into a coupling.
Figure 2:
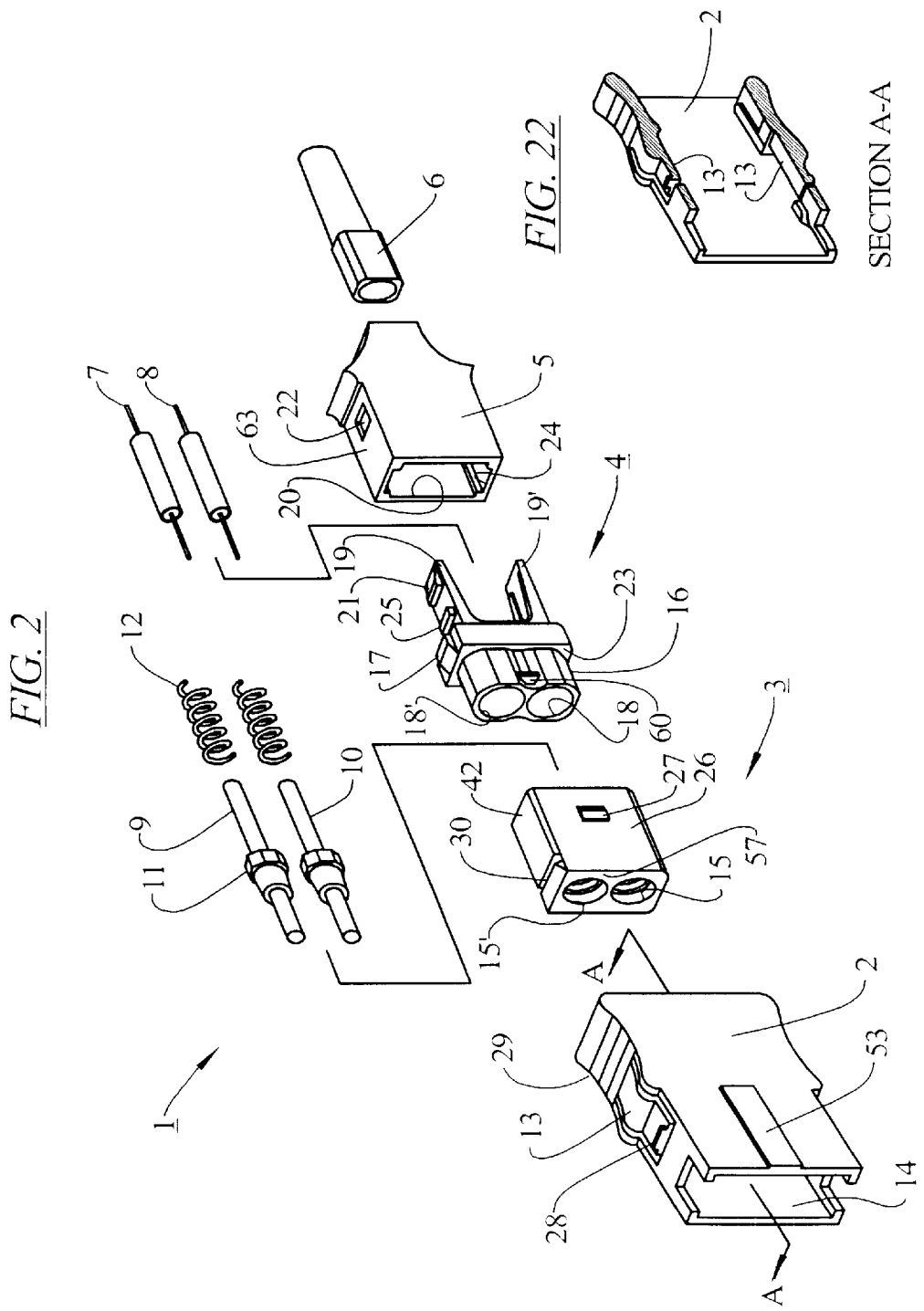
FIG. 2 shows an exploded perspective representation of a double plug for the representation of all the individual parts.
Figure 3:
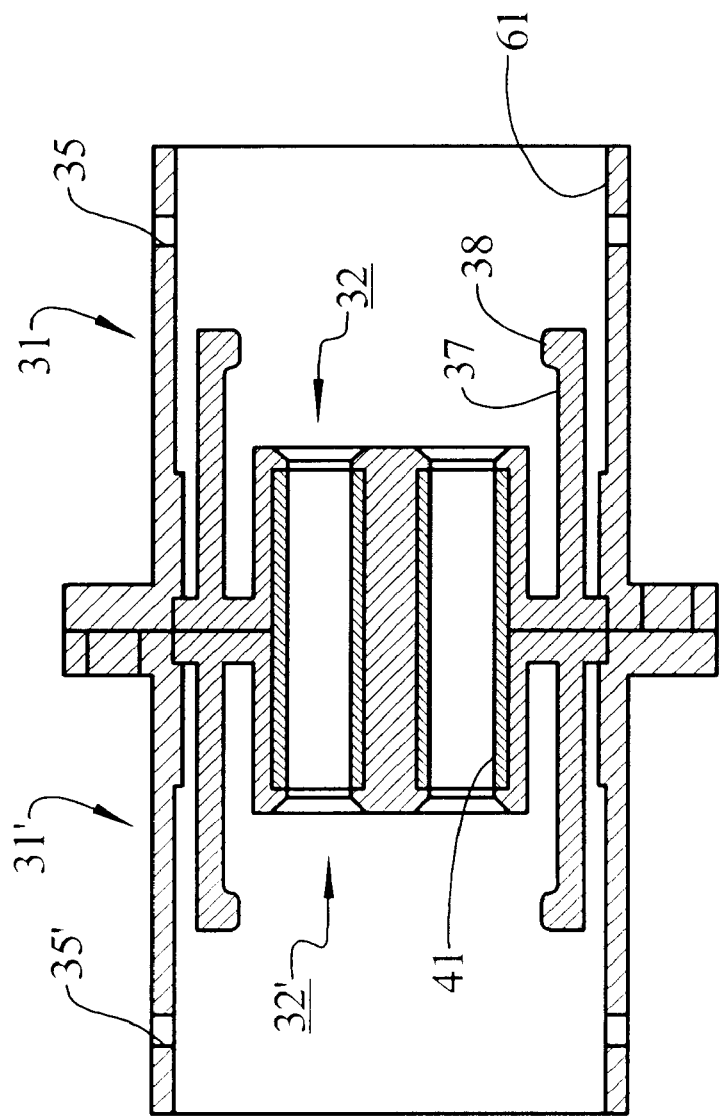
FIG. 3 shows a cross section through two couplings joined to one another for the reception of two oppositely inserted plugs.
Figure 4:
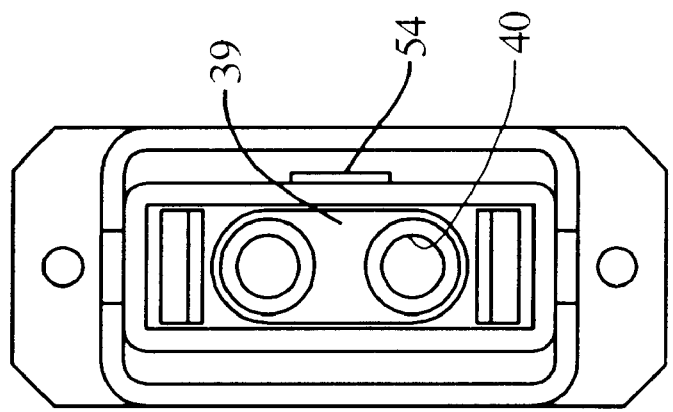
FIG. 4 shows a plan view of FIG. 3 from above.
Figure 5:
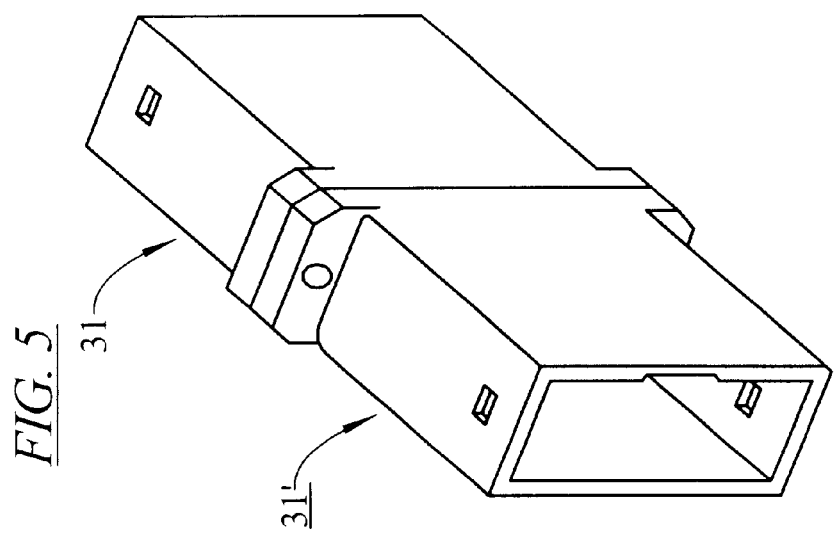
FIG. 5 shows a perspective view of FIG. 3.
Figure 6:
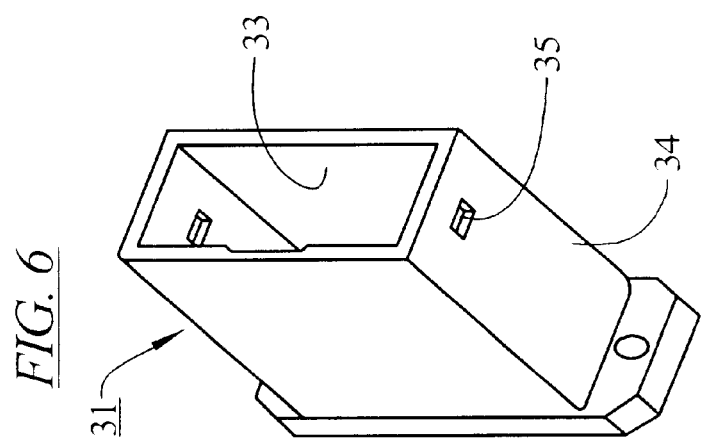
FIG. 6 shows a perspective view of an individual coupling according to FIG. 5.

According to FIGS. 2 to 9 and 23 there is represented there a double plug which consists, as essential parts, of a plug housing 2, a core housing 3, a core interior housing 4 as well as a receiving housing 5, into which there is introduced a photo-conductor bundle and which follows upon the core interior housing 4. The core housing 3 there, is constructed as a housing block with two broad sides 26 lying opposite one another, and narrow sides 42 arranged between them as well as a forward facing face surface 57, in which two passage holes 15, 15', separated by a wall 65, are arranged one over the other. The core interior housing 4 comprises a block 17 which carries on its front broad side 23 a double cylinder 16 in the direction of the longitudinal axis of the plug 1, wherein the double cylinder 16 has two passage holes, 18, 18', separated by a wall 66. On the oppositely lying turned-away broad side of the block plate 17 there extend, perpendicularly to the same, two spaced guide tongues 19, 19' which each form on their outer sides a transversely running web 25 as well as locking lugs 21. Core housing 3 and core interior housing 4 form a so-called double unit for the reception of two ferrules 9, 10, which are supported, spring loaded, within this double unit by means of pressure springs 12, as is shown in detail in FIGS. 8, 9 and 23.

Figure 9:
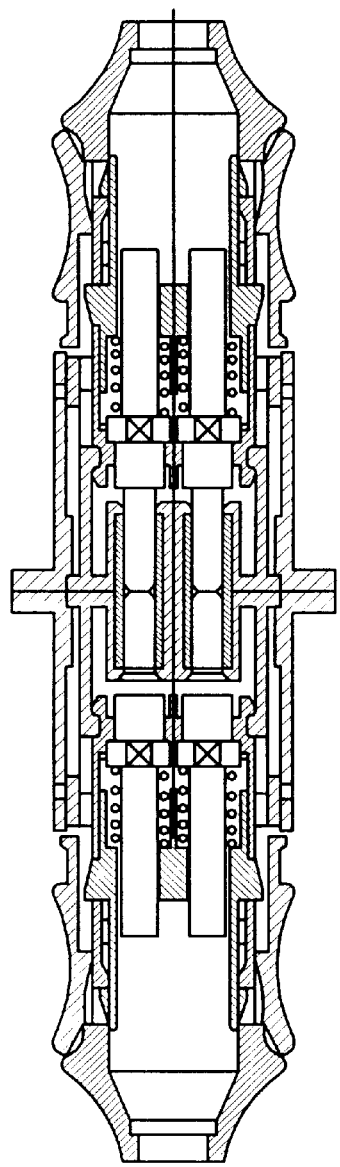
FIG. 9 shows a longitudinal section through two plugs which are oppositely plugged into two couplings.
Figure 8:
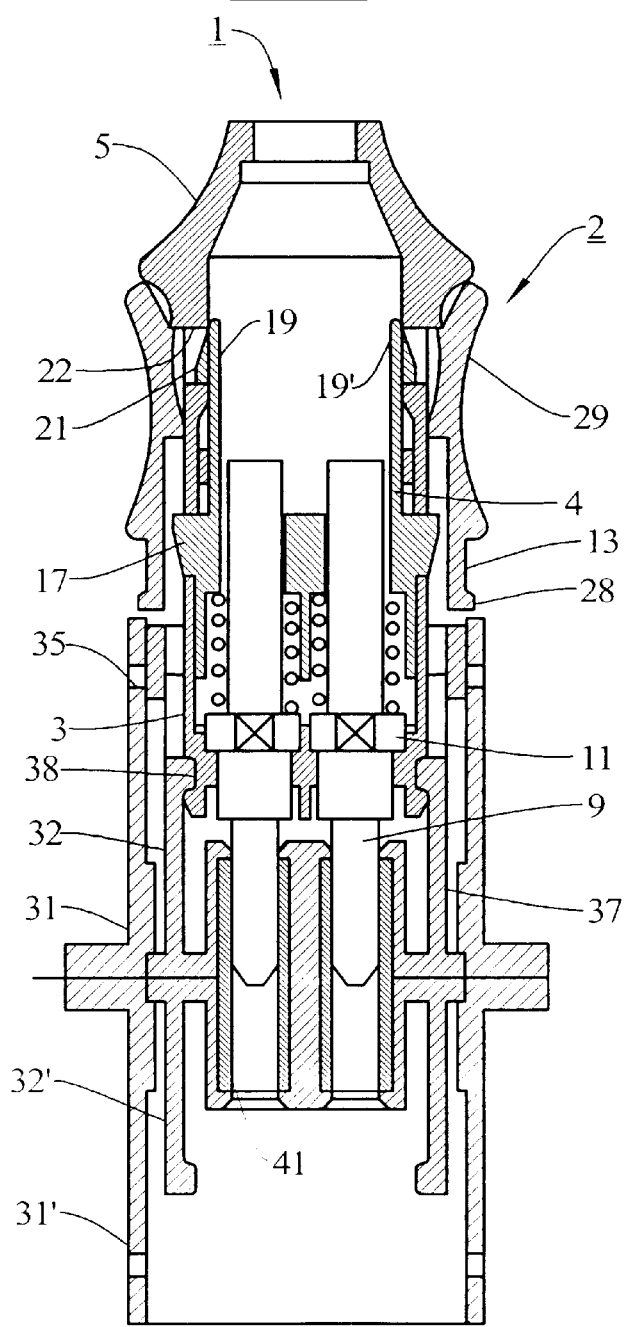
FIG. 8 shows a longitudinal section through a plug together with two couplings.
Figure 10:
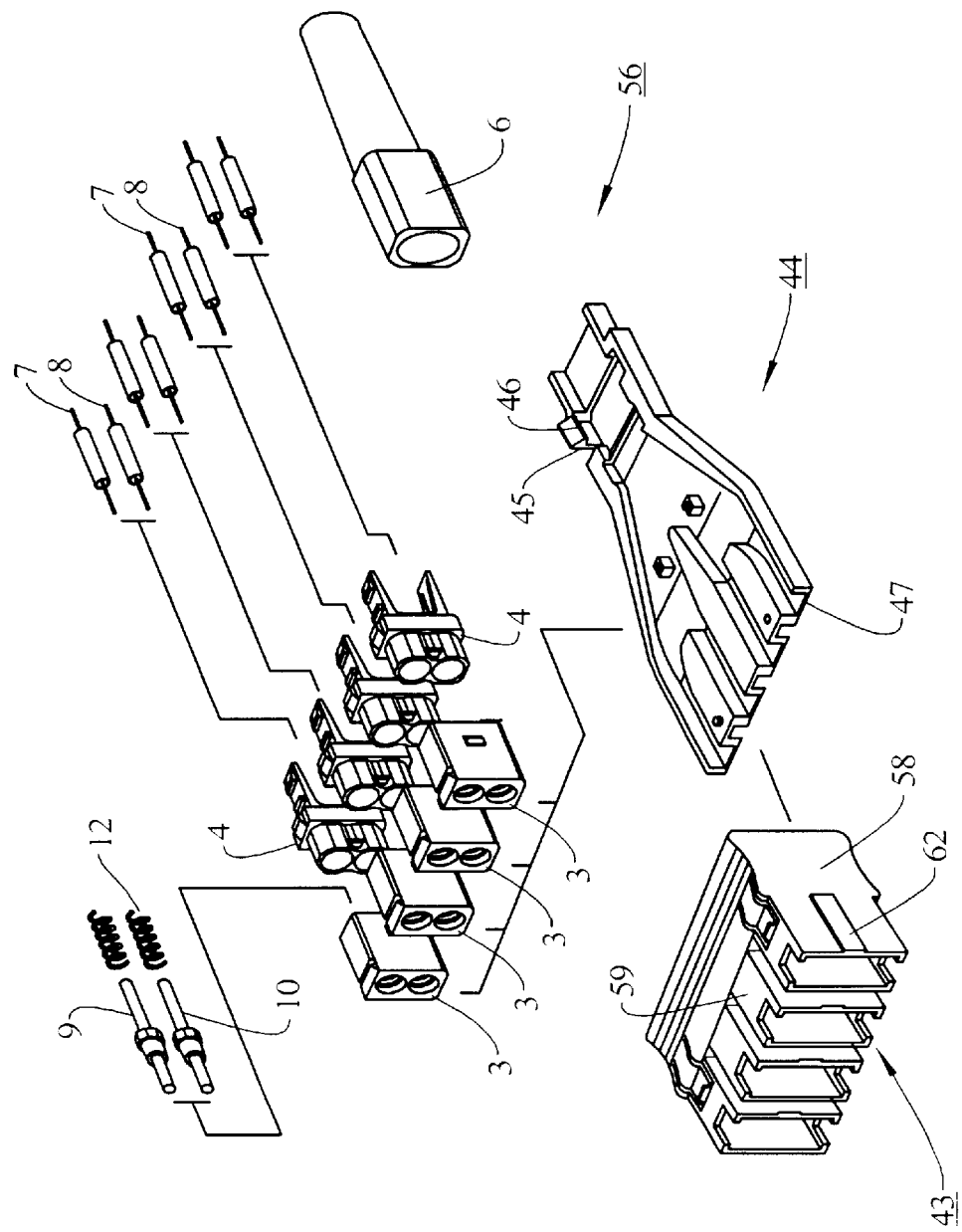
FIG. 10 shows an exploded perspective representation of a multiple plug housing, namely an octuple, for the representation of the individual parts.
Figure 23:
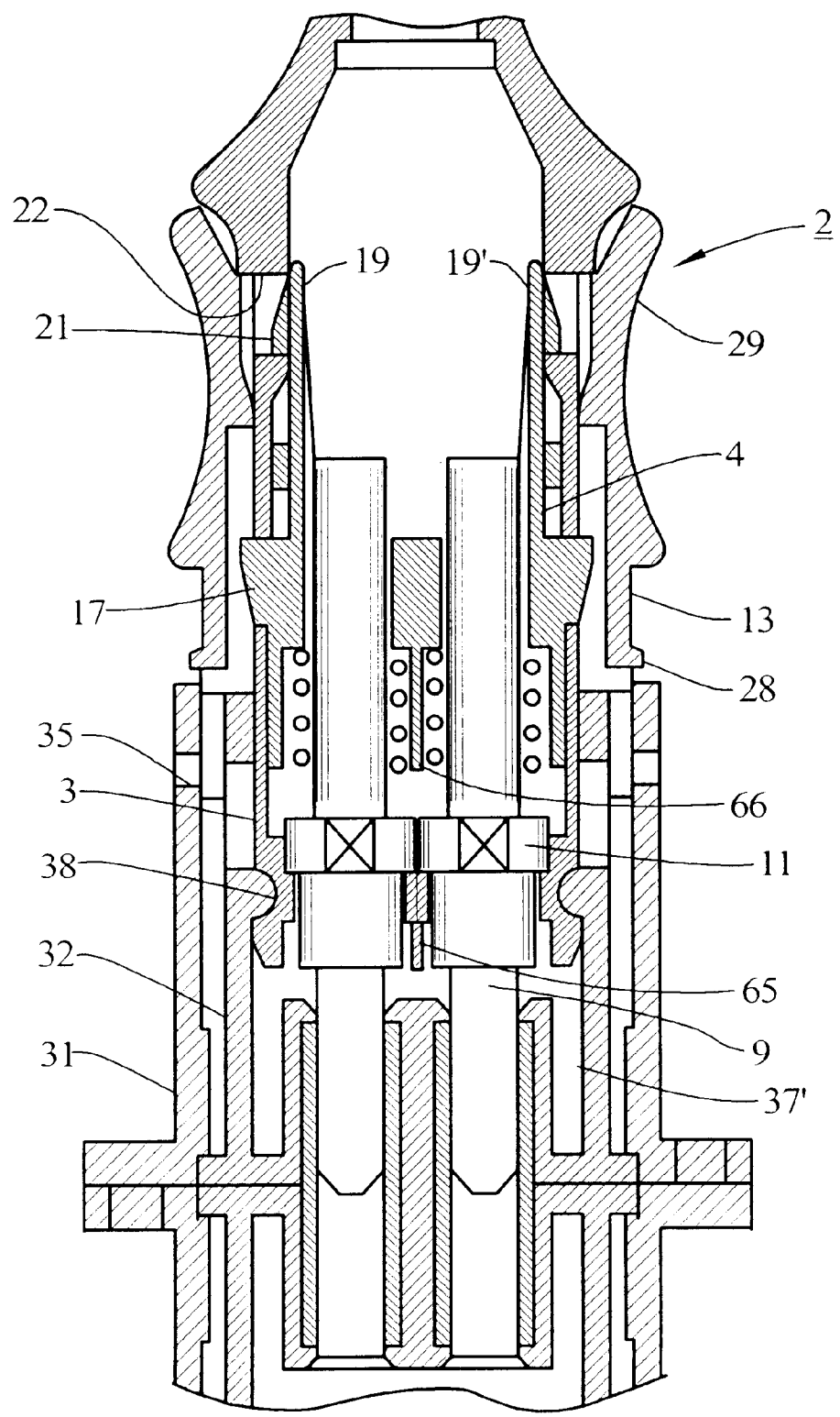
FIG. 23 shows an enlarged partial view of the plug of FIG. 8.

The core housing 3 and also the core interior housing 4 are constructed for the reception of the two ferrules 9, 10, the ferrules being supported in the core housing 3, which is evident especially from FIGS. 8, 9 and 23, and the front ends of the ferrules 9, 10 pass through the face surface 57 of the core housing in forward direction. The rear ends of the ferrules 9, 10 extend into the core interior housing 4, which is likewise to be learned from FIGS. 8 and 23. Core housing 3 and core interior housing 4 are relatively inserted at least partially in one another there, and thereby form the double unit 3–4, in which in the example shown the core interior housing 4 is plugged with its front part into the receiving space of the core housing 5. With the joining of core housing 3 and core interior housing 4, the core housing 3 stands on the front broad side 23 of the block plate 17 of the core interior housing 4, as is evident from FIG. 8. The double cylinder 16 on the block plate 17 has a locking lug 60 which, in the sliding-on of the core housing 3 or of the housing block onto the double cylinder 16, locks into a locking window 27 within the broad side 26 of the core housing 3 or of the housing block 3.

For the exact support of the ferrules 9, 10 these have, in a mown manner, a permanently arranged rotation-safeguard 11 which carries a plurality of key surfaces, by reason of which the ferrules can be positioned relatively to this, in a corresponding angular division that corresponds to the number of key surfaces within the core housing. The ferrules 9, 10 are installed there from behind into the core housing 3 and arranged in correspondingly formed seats next to one another within the core housing, and they are movably supported in axial direction, a pressure spring 12 being thrust from behind onto each ferrules 9, 10 and engaging with their front end on the rotation safeguard 11. The rear end of the pressure spring 12 is braced against an inner offset of the core interior housing, this internally surrounding offset lying in the zone of the block plate 17, as is to be learned from FIG. 8. In this manner the ferrules 9, 10 can move somewhat in axial direction against the spring force of the springs 12. The rear ends of the ferrules 9, 10 are guided through corresponding passage holes within the block plate 17 and extend longitudinally between the guide tongues 19, 19', as is likewise best evident from FIG. 8 and FIG. 23. The ferrules 9, 10 are held in separate chambers formed by the passage holes 15, 15' and wall 65 in the core housing 3 and passage holes 18, 18' and wall 66 in the core interior housing 4 such that they do not come into contact with one another.

The double unit 3–4 of core housing 3 and core interior housing 4 is plugged into a receiving volume 20 of a rear receiving housing 5, which is likewise constructed essentially as a housing block; into this receiving housing 5 there is introduced from behind a photoconductor bundle 6. The photo-conductor bundle 6 has at least two photo-conductor fibers 7, 8, the photo-conductor fibers 7, 8 being guided through the ferrules 9, 10 onto the tips of same. For the assembling of core housing 3, core interior housing 4 and receiving housing 5, after the mounting of the photo-conductor fibers 7, 8 inside the ferrules 9, 10, the double unit 3–4 with the ferrules 9, 10 arranged in it is plugged into the receiving volume 20 of the receiving housing 5. The receiving housing 5 has in the inner side of the narrow sides 63, guide grooves 24 in which, by the sliding-in of the guide tongues 19, 19', the locking lugs 21 as well as the transversely running webs 25 slide along, whereby in the end position the locking lugs 21 become locked with locking windows 22 present in the narrow sides 63 of the receiving housing 5. Then the outer, face-side edge of the receiving housing or housing block is seated on the front broad side 23 of the block plate 17, as is to be learned from FIG. 8.

The double unit 3–4 together with the receiving housing 5 are introduced into a plug housing 2, which is likewise constructed essentially as a housing block with two oppositely-lying large housing surfaces and two narrow sides arranged between them; the plug housing 2 is open on its two face sides. The core housing 3, the core interior housing 4 and the receiving housing 5 are supported floatingly in the plug housing 2.

In the plugging of the plug 1 into a coupling the core housing 3, by reason of a mutual locking, locks within the coupling with its front end, this being especially shown in FIGS. 3 to 9. A single coupling consists of an outer coupling housing 31, 31', into which there is installed an inner coupling housing 32, 32'. Both parts, namely outer coupling housing 31, 31' as well as inner coupling housing 32, 32', are preferably present in double form, as is to be learned from FIGS. 3, 5 and 9 when, by means of two identical plugs 1 a continuation of a light wave conductor connection is to be created. The plug housing 2 can be slid into the receiving volume 61 of the outer coupling housing 31, 31', for which purpose the inner contour of the receiving volume 61 of the outer coupling housing 31, 31' and the outer contour of the plug housing 2 are correspondingly formed.

Figure 7:
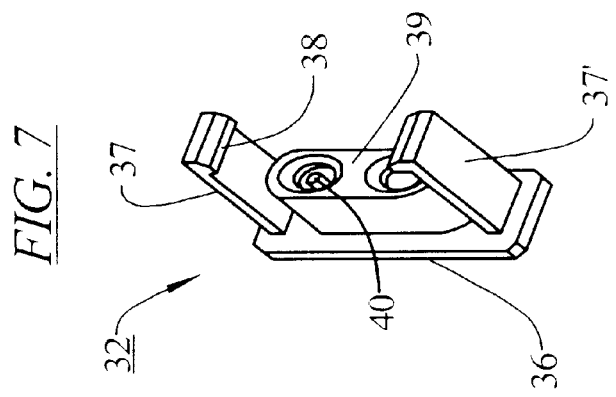
FIG. 7 shows a perspective view of an inner coupling housing inside of the outer coupling housing according to FIG. 6.

Within each outer coupling housing 31, 31' there is arranged an inner coupling housing 32, 32', which according to FIG. 7 consists of a plate 36 on which there is centrally arranged oblong-oval receiving part 39 with two passage holes 40, the plate 36 having holes aligned with the passage holes 40. Further, there rise on the plate 36 two arms 37, 37' standing opposite each other with spacing, between which there is locked the receiving part 39, the arms 37, 37' having locking lugs 38 on their free ends. As is to be learned from FIG. 8 these locking lugs 38, in the advancing of the plug 1 into the outer coupling housing 31, 31', engage into the transverse grooves 30 running on the inner side of the narrow sides 42 of the core housing 3, and lock therein. In this manner the double unit 3–4 is securely supported inside the inner coupling housing 32, 32'.

A further preferred form of execution of the plug 56 is shown in FIGS. 10 to 21, which show a multiple double plug 56 with an octuple multiple plug housing. Essentially, a multiple double plug is composed of a plurality of double plugs in which, in each case, the double unit 3–4 of core housing 3 and core interior housing 4 is present, and they are constructed alike. Therewith for the construction of a multiple double plug 56 there are present multiply in identical manner the double units 3–4 comprised of core housing 3 and core inner housing 4, these double units 3–4 being arranged adjacently in a receiving housing 44. The receiving housing 44, into which the photo-conductor bundle 6 is introduced from behind, can be executed preferably modified with respect to the receiving housing 5 of the double plug 1.

Preferably, for the construction of a multiple double plug, the double plugs are present 2-n times. To be sure, there are likewise possible purposeful forms of executions for special applications in which, for example, three individual ferrules are arranged in a triple core housing, as well as a three-core inner housing, in which case the ferrules can be arranged adjacent to one another or over one another.

In the multiple double plug 56 shown by way of example, the receiving housing 5 consists of two housing shells 44 arranged one over the other, of which only one is represented and between which there are arranged adjacently the double units 3–4 as they are described for the execution of the double plug 1. The core interior housings 4 can mesh with one another in the two housing shells 44 by means of a locking 21, 48, 49. The double units 3–4 as well as the receiving housing 5 are plugged into a multiple plug housing 43 and supported floating therein, the multiple plug housing 43 comprising a plurality of double plug housing 58 and 59 arrayed on one another and joined with one another. The inside-lying double plug housings 59 are executed identically; the respective border-side double plug housings 58 are arranged symmetrically to one another.

FIGS. 11 and 12 show a plan view of a housing shell 44 of the receiving housing as well as a view of the face side of a housing shell 44 of a multiple double plug 56. In the inner main side 50 of each housing shell 44 there are formed receiving grooves 47 spaced from one another, which have on their bottom surfaces locking windows 48 and 49. The receiving grooves 47 serve for the reception of the double unit 3–4, in which the web 25 (FIG. 2) snaps into the locking window 49 and the locking lug 21 into the locking window 48. The housing shell 44 has on its rear, tapering end into which the photo-conductor bundle 6 is introduced, locking means which consist, for example, of in each case a guide tongue 45 with a locking lug 46 emplaced thereon.

FIGS. 13 to 19 show in various representations and sections the multiple plug housing 43 of a multiple double plug 56. The individual double plug housings 58 and 59 are spaced from one another on their front end facing the coupling, and combined on their rear end facing away from the coupling, which is evident from FIGS. 10 and 19.

Figure 21:
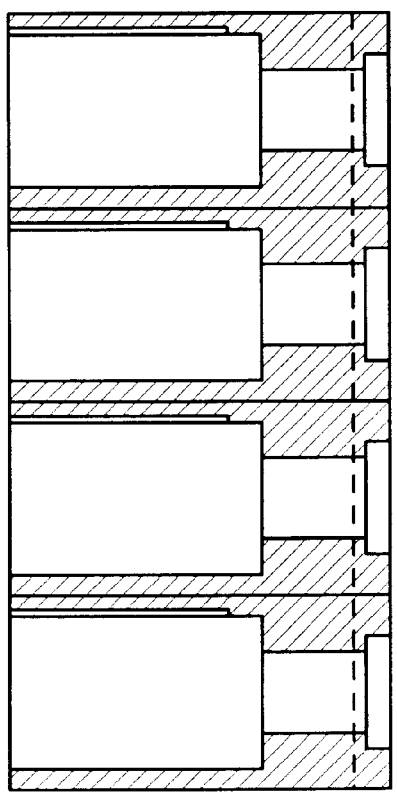
FIG. 21 shows a section along the line A—A in FIG. 20
Figure 20:
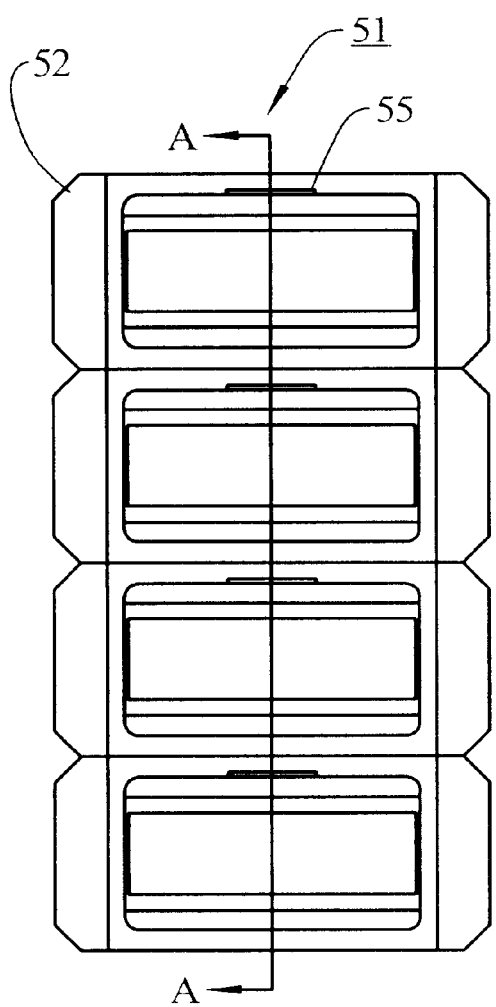
FIG. 20 shows a plan view of an appertaining multiple coupling.

In FIG. 20 there is shown a plan view, in FIG. 21, a section along the line A—A of FIG. 20 of a multiple coupling, which is allocated to a multiple double plug 56. Such a multiple coupling again consists of an outer coupling housing 51, which comprises a plurality of receiving parts 52 corresponding to an outer coupling housing for a double plug. This plurality of receiving parts 52 is collected into a block which forms an integrated outer coupling housing 51. In each individual receiving part 52 of the outer coupling housing 51 there is arranged an inner coupling housing 32, 32' corresponding to FIG. 7. It is perceived from FIG. 20, as well as from FIGS. 3 and 6, that the inner wall of the outer coupling 31 or of the individual receiving part 52 has in the broad side a guide groove 55, 61. Into this respective guide groove 55, 61, in the introducing of the plug housing 2 or of the multiple plug housing 43 into the appertaining coupling housing 31, 31' or 51, there slides a raised longitudinal ridge 53 or 62 for the guidance inside of the coupling, the longitudinal ridge 53 or 62 being formed on at least one of the outer broad sides of the plug housing 2 or of the multiple plug housing 43.

With the object of the invention it is now advantageously possible to process especially cores bundles of photoconductors, therefore individual fibers, as well as little bands. In particular the object of the invention as a fourfold, or even higher plugs densities with respect to comparable plugs of the state of the art. The plug of the invention can be used for connecting cables, jumper cables or trunk cables, as well as for the feed in boxes of distributor cabinets. For example, in a box there can now be contacted 32 fibers instead of 8. Also, for the better sealing, and against an undesired pulling-out of the plug of the invention, an additional locking sleeve (lock hood) can be provided.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim:

1. A plug for light wave conductors or photo-conductors comprising:
   a plug housing,
   a photo-conductor bundle with at least two photo-conductor fibers introduced into a rear end of said plug housing,
   said plug housing having a front end with ferrules emerging therefrom, into which, in each case, one of the photo-conductor fibers is introduced,
   the ferrules being supported in a ferrule housing which is installed in the plug housing correspondingly formed for the reception of the ferrule housing,
   the ferrules being movable spring-loaded in their axial direction,
   the plug being plugged together with a coupling housing that receives this plug,
   wherein the ferrule housing comprises a core housing and a core interior housing, which are designed for the reception of two ferrules,
   the ferrules being supported in the core housing, and front ends of the ferrules extending forward through the core housing and rear ends of the ferrules extending into the core interior housing,
   the core housing and core interior housing being plugged relatively at least partly into one another and forming a double unit.

2. A plug according to claim 1, wherein the core housing on insertion of the plug into the coupling housing is locked with its front end in the coupling housing by reason of a mutual locking.

3. A plug according to claim 2, wherein the mutual locking of core housing and the coupling housing, with respect to the core housing comprises a transverse groove which runs in each narrow side of the core housing, the coupling housing comprising an outer coupling housing, and an interior coupling housing which is formed from an essentially block-form plate on which there rise vertically two arms having ends on which locking lugs are arranged which lock between the two arms of the interior coupling housing in the transverse grooves.

4. A plug according to claim 1, wherein for the construction of a multiple double plug, double unit comprising the core housing and core interior housing, is present multiply in an identical manner, the double units being arranged next to one another in a receiving housing.

5. A plug according to claim 4, wherein the receiving housing comprises two housing shells arranged one over the other, between which the double units are arranged adjacently to one another, the core interior housings being locked with one another in the housing shells by means of a locking and the double units as well as the receiving housing being plugged into a multiple plug housing and supported floatingly there, which multiple plug housing comprises a plurality of double plug housings arrayed on one another and connected with one another.

6. A plug according to claim 5, wherein the two outer double plug housings of the multiple plug housing have lash plates for the releasing of the locking with the receiving housing.

7. A plug according to claim 1, wherein the ferrules are held in separate chambers formed by passage holes and a separating wall in the core housing and passage holes and a separating wall in the core interior housing such that they do not come into contact with one another.

8. A plug for light wave conductors or photo-conductors comprising:
   a plug housing,
   a photo-conductor bundle with at least two photo-conductor fibers introduced into a rear end of said plug housing,
   said plug housing having a front end with ferrules emerging therefrom, into which, in each case, one of the photo-conductor fibers is introduced,
   the ferrules being supported in a ferrule housing which is installed in the plug housing correspondingly formed for the reception of the ferrule housing,
   the ferrules being movable spring-loaded in their axial direction,
   the plug being plugged together with a coupling housing that receives this plug,
   wherein the ferrule housing comprises a core housing and a core interior housing, which are designed for the reception of two ferrules,
   the ferrules being supported in the core housing, and front ends of the ferrules extending forward through the core housing and rear ends of the ferrules extending into the core interior housing,
   the core housing and core interior housing being plugged relatively at least partly into one another and forming a double unit,
   a receiving housing emplaced on a rear part of the core interior housing into which the photo-conductor bundle is introduced, and the core housing, the core interior housing and the receiving housing being plugged into the plug housing and being supported floatingly in the plug housing.

9. A plug according to claim 8, wherein the ferrules are held in separate chambers formed by passage holes and a separating wall in the core housing and passage holes and a separating wall in the core interior housing such that they do not come into contact with one another.

10. A plug for light wave conductors or photo-conductors comprising:

a plug housing, a photo-conductor bundle with at least two photo-conductor fibers introduced into a rear end of said plug housing, said plug housing having a front end with ferrules emerging therefrom, into which, in each case, one of the photo-conductor fibers is introduced, the ferrules being supported in a ferrule housing which is installed in the plug housing correspondingly formed for the reception of the ferrule housing, the ferrules being movable spring-loaded in their axial direction, the plug being plugged together with a coupling housing that receives this plug, wherein the ferrule housing comprises a core housing and a core interior housing, which are designed for the reception of two ferrules, the ferrules being supported in the core housing, and front ends of the ferrules extending forward through the core housing and rear ends of the ferrules extending into the core interior housing, the core housing and core interior housing being plugged relatively at least partly into one another and forming a double unit, a receiving housing emplaced on a rear part of the core interior housing into which the photo-conductor bundle is introduced, the core housing, the core interior housing and the receiving housing being plugged into the plug housing and being supported floatingly in the plug housing, and the core housing having the form of a housing block with side walls and a front face surface in which there are centrally present two passage holes for the passage of the ferrules, the housing block being open at a rear for receiving the ferrules.

11. A plug according to claim 10, wherein the ferrules are held in separate chambers formed by passage holes and a separating wall in the core housing and passage holes and a separating wall in the core interior housing such that they do not come into contact with one another.

12. A plug for light wave conductors or photo-conductors comprising:

a plug housing, a photo-conductor bundle with at least two photo-conductor fibers introduced into a rear end of said plug housing, said plug housing having a front end with ferrules emerging therefrom, into which, in each case, one of the photo-conductor fibers is introduced, the ferrules being supported in a ferrule housing which is installed in the plug housing correspondingly formed for the reception of the ferrule housing, the ferrules being movable spring-loaded in their axial direction, the plug being plugged together with a coupling housing that receives this plug, wherein the ferrule housing comprises a core housing and a core interior housing, which are designed for the reception of two ferrules, the ferrules being supported in the core housing, and front ends of the ferrules extending forward through the core housing and rear ends of the ferrules extending into the core interior housing, the core housing and core interior housing being plugged relatively at least partly into one another and forming a double unit, the core interior housing comprising a block plate provided with passage holes, on a front side of which there is emplaced a double cylinder extending in an axial direction of the plug with two passage holes, and, on its rear side, two guide tongues extending in axial direction for their introduction into the receiving housing, the guide tongues and receiving housing having mutual locking means.

13. A plug according to claim 12, wherein the locking means comprise rest lugs arranged on the guide tongues, which lugs, after introduction into the receiving housing, snap into lock windows arranged therein, the receiving housing having the form of a housing block with side walls which have lock windows at corresponding places.

14. A plug according to claim 12, wherein the ferrules are held in separate chambers formed by passage holes and a separating wall in the core housing and passage holes and a separating wall in the core interior housing such that they do not come into contact with one another.

* * * * *